United States Patent
Cabell et al.

(10) Patent No.: US 6,458,447 B1
(45) Date of Patent: *Oct. 1, 2002

(54) EXTENSIBLE PAPER WEB AND METHOD OF FORMING

(75) Inventors: David William Cabell, Cincinnati; Mark Ryan Richards, Middletown, both of OH (US)

(73) Assignee: The Proctor & Gamble Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/061,611

(22) Filed: Apr. 16, 1998

(51) Int. Cl.[7] .............................. B32B 3/28; B32B 3/30; A61F 13/20; D21H 27/00
(52) U.S. Cl. ........................ 428/167; 428/152; 428/172; 428/181; 428/182; 428/184; 428/198; 604/374; 604/385.01; 162/109; 162/123
(58) Field of Search ............................ 604/374, 385.01; 428/154, 156, 167, 172, 181, 182, 183, 184, 198; 162/109, 117, 123, 125

(56) References Cited

U.S. PATENT DOCUMENTS

| 1,954,635 | A |   | 4/1934  | Leonard, Jr. ............... 18/10 |
| 3,301,746 | A | * | 1/1967  | Sanford et al. ............ 162/113 |
| 3,348,477 | A |   | 10/1967 | Taylor, Jr. et al. ........... 101/23 |
| 3,867,225 | A | * | 2/1975  | Nystrand .................... 156/209 |
| 3,868,205 | A |   | 2/1975  | Thomas ...................... 425/363 |
| 3,961,119 | A | * | 6/1976  | Thomas ...................... 428/178 |
| 4,008,047 | A | * | 2/1977  | Petersen ................. 23/258.5 M |
| 4,469,735 | A | * | 9/1984  | Trokhan ...................... 428/154 |
| 4,507,173 | A |   | 3/1985  | Klowak et al. ............. 162/112 |
| 4,514,345 | A |   | 4/1985  | Johnson et al. ............... 264/22 |
| 4,528,239 | A |   | 7/1985  | Trokhan ...................... 428/247 |
| 4,529,480 | A |   | 7/1985  | Trokhan ...................... 162/109 |
| 4,637,859 | A |   | 1/1987  | Trokhan ...................... 162/109 |
| 5,245,025 | A |   | 9/1993  | Trokhan et al. ............... 536/56 |

(List continued on next page.)

FOREIGN PATENT DOCUMENTS

DE           197 34 414 A        2/1999

Primary Examiner—Timothy Meeks
Assistant Examiner—Elena Tsoy
(74) Attorney, Agent, or Firm—Roddy M. Bullock; David K. Mattheis; David M. Weirich (57) ABSTRACT

A paper web of the present invention has a longitudinal centerline and a transverse centerline, and comprises a plurality of first regions and a plurality of second regions. The first regions form boundaries separating the second regions, the first regions being substantially in a plane of the paper web. The second regions comprise a plurality of raised out-of-said-plane rib-like elements, the rib-like elements of each second region being disposed parallel to a major rib axis and perpendicular to a minor rib axis. All or most of each first regions have both major rib axis and minor rib axis components. The first and second regions undergo geometric deformation when the web material is subjected to an applied elongation along at least one axis. A method of the present invention comprises the steps of providing a cellulosic substrate; providing a first platen comprising toothed regions and untoothed regions; providing a second platen comprising toothed regions, the second platen being aligned with the first platen such that the toothed regions of the first and second platens mesh when operably engaged; and pressing the cellulosic substrate between the first platen and the second platen such that the toothed regions deform said web to form regions of discrete fan-folded rib-like elements. Optionally, the cellulosic substrate can be moistened prior to the pressing step.

21 Claims, 5 Drawing Sheets

U.S. PATENT DOCUMENTS

| | | | |
|---|---|---|---|
| 5,458,950 A | * 10/1995 | Bredenick et al. | 428/154 |
| 5,503,715 A | 4/1996 | Trokhan | 162/296 |
| 5,518,801 A | * 5/1996 | Chappell et al. | 428/152 |
| 5,534,326 A | 7/1996 | Trokhan et al. | 428/131 |
| 5,650,214 A | 7/1997 | Anderson et al. | 428/152 |
| 5,743,999 A | 4/1998 | Kamps et al. | 162/113 |

* cited by examiner

EXTENSIBLE PAPER WEB AND METHOD OF FORMING

FIELD OF THE INVENTION

This invention relates to paper webs and methods of making formed paper webs. In particular, this invention relates to disposable absorbent paper webs such as paper towels, wipes, tissues, and toilet tissue and methods of making such webs.

BACKGROUND OF THE INVENTION

Disposable paper products such as paper towels, wipes, facial tissue, and toilet tissue have long been popular, primarily for single or limited use applications. Depending on the intended end use, paper products of this type generally require varying levels of softness, absorbency and strength. In addition to softness, absorbency and strength, the overall look, feel, and performance of disposable paper products is important, particularly in premium paper products.

Two important characteristics that contribute to the overall look, feel, and performance of disposable paper products are bulk and extensibility. Bulk is defined as the ratio of paper thickness to basis weight. Bulk may be increased by increasing the thickness, or caliper, of the paper, without increasing its basis weight, such as by embossing. Extensibility refers to the ability of paper to stretch significantly without tearing. Extensibility is not typically an attribute of uncreped paper webs, particularly tissue paper webs. Foreshortening of paper, such as by creping or wet microcontraction, may increase extensibility, but it also increases basis weight. Tissue paper webs generally have only a few percent elongation to break, due to the relatively inelastic nature of the constituent paper fibers. However, increasing the extensibility, and more preferably the elasticity, of paper webs would significantly enhance the overall look and feel of the paper web.

Increasing bulk without significantly increasing basis weight contributes to the texture and subjective softness of the paper by increasing its compressibility, resulting in a favorable tactile impression to the user. Increasing extensibility contributes to the overall look, feel, and performance of disposable paper products by increasing the subjective feeling of softness, or hand, of the web. In paper towels, wipes, and other paper products useful for scrubbing, increased extensibility also aids in preventing unwanted tearing of the sheet during use.

Paper webs produced on conventional papermaking machines are typically formed by depositing an aqueous slurry of paper fibers on a foraminous surface, such as one of a pair of converging Fourdrinier wires where initial dewatering and rearranging of fibers occurs. After the initial forming of the paper web on the Fourdrinier wires, the paper is transferred to a press dewatering felt for further drying by dewatering. Dewatering felts of conventional paper machines are typically made of tightly woven felt composed of very fine fibers of wool or synthetic material. To dewater the paper, the dewatering felt and paper are pressed between pairs of rolls running together, similar to the rolls on a wringer-type washing machine. The rolls often incorporate vacuum systems to more effectively draw water from the paper and the felt. Additional sheet compaction occurs as a pressure roll adheres the entire sheet area to a drying drum such as a Yankee dryer.

The compaction necessary to economically form and dry paper webs on conventional paper making machines causes such webs to have relatively low caliper, relatively high stiffness, and limited extensibility. Increasing caliper may be accomplished by increasing the amount of paper fibers in the starting furnish. But increasing caliper in this manner simply increases basis weight correspondingly, and therefore does not increase bulk or decrease relative stiffness.

In recent times various modifications and improvements to conventional paper making machines have been made to make bulkier and somewhat more extensible disposable paper products. One significant improvement to the manufacturing process, which yields a significant improvement in the resulting consumer products, is the use of through-air-drying to replace conventional press felt dewatering. In through-air-drying, like press felt drying, the web begins on a forming wire which receives an aqueous slurry of less than one percent consistency (the weight percentage of fibers in the aqueous slurry) from a headbox. Initial dewatering takes place on the forming wire. From the forming wire, the web is transferred to an air pervious through-air-drying belt. This "wet transfer" occurs at a pickup shoe, at which point the web may be molded to the topography of the through air drying belt.

Over time, further improvements became necessary. A significant improvement in through-air-drying belts is the use of a resinous framework on a reinforcing structure. The resinous framework generally has a first surface and a second surface, and deflection conduits extending between these surfaces. The deflection conduits provide areas into which the fibers of the web can be deflected and rearranged. This arrangement allows drying belts to impart continuous patterns, or, patterns in any desired form, rather than only the discrete patterns achievable by the woven belts of the prior art. Examples of such belts and the cellulosic fibrous structures made thereby can be found in U.S. Pat. No. 4,514,345, issued Apr. 30, 1985 to Johnson et al.; U.S. Pat. No. 4,528,239, issued Jul. 9, 1985 to Trokhan; U.S. Pat. No. 4,529,480, issued Jul. 16, 1985 to Trokhan; and U.S. Pat. No. 4,637,859, issued Jan. 20, 1987 to Trokhan. The foregoing four patents are incorporated herein by reference for the purpose of showing preferred constructions of patterned resinous framework and reinforcing type through-air-drying belts, and the products made thereon. Such belts have been used to produce extremely commercially successful products such as Bounty paper towels and Charmin Ultra toilet tissue, both produced and sold by the instant assignee.

Still another improvement to the papermaking process involves a special papermaking apparatus that provides a paper web having multiple basis weight regions. Such a process is described in U.S. Pat. No. 5,245,025, issued Sep. 14, 1993 to Trokhan et al.; U.S. Pat. No. 5,503,715, issued Apr. 2, 1996 to Trokhan et al.; and U.S. Pat. No. 5,534,326, issued Jul. 9, 1996 to Trokhan et al.; the disclosure of each of which is hereby incorporated herein by reference.

All of the above mentioned improvements to conventional papermaking to make bulkier and somewhat more extensible disposable paper products involve significant modifications to existing equipment and machinery. Although the added bulk, with its accompanying characteristics of texture and softness, is desirable, the capital costs associated with modifying a conventional papermaking machine to incorporate the necessary improvements are often prohibitive.

In both conventional and nonconventional paper making a certain level of extensibility is typically produced in paper by a foreshortening operation after drying the paper. While foreshortening can take a number of forms, creping is the most common form. Creping typically occurs as one of the last steps in the paper making process as the formed, dry paper is removed from a drying drum by a doctor blade. In a simplistic view, creping forms a pattern of microscopic ridges and folds transverse to the machine direction of the web. The frequency and amplitude of the microscopic accordion-like folds can be varied somewhat within narrow operating ranges, and the resulting web only gains extensibility in the machine direction. Extensibility in the cross direction remains virtually unchanged, being only a few percent tensile elongation to break. In addition, the creping process increases the basis weight of the web proportional to the amount of creping. Therefore, a given level of crepe-induced extensibility is accompanied by a proportional increase in basis weight.

Increasing the caliper and bulk of paper webs produced on either conventional or non-conventional papermaking machines may also be achieved in post-paper making converting operations. Converting operations refer to further processing of finished paper into different forms, such as by embossing, printing, and packaging. For example, higher caliper can be achieved by laminating single plies of paper into multi-ply products, and higher bulk can be achieved by embossing. Bulk and caliper can be increased by a combination of embossing and laminating. However, conventional embossing, particularly macro-pattern embossing, requires a relatively stiff sheet to retain the embossing pattern. Also, conventional macro-pattern embossing typically has little effect on paper extensibility, and virtually no effect on paper elasticity. By "macro-pattern embossing" is meant embossing which forms patterns easily distinguishable by the human eye when observed from a distance of approximately 12 inches.

Accordingly, there is a need for a means of economically converting paper webs, particularly webs made on conventional paper making machines, into paper webs having increased bulk, texture, and good overall look and feel, together with increased extensibility in at least one direction.

Additionally, it would be desirable to have disposable paper products with increased bulk, texture, and good overall look and feel, together with increased extensibility and elasticity in at least one direction.

Further, it would be desirable to be able to produce paper webs having increased bulk, texture, and good overall look and feel, in a post-papermaking operation that does not require capital expenditures to modify an existing papermaking machine.

SUMMARY OF THE INVENTION

A paper web of the present invention has a longitudinal centerline and a transverse centerline, and comprises a plurality of first regions and a plurality of second regions. The first regions form boundaries separating the second regions, the first regions being substantially in a plane of the paper web. The second regions comprise a plurality of raised out-of-said-plane rib-like elements, the rib-like elements of each second region being disposed parallel to a major rib axis and perpendicular to a minor rib axis. All or most of each first regions have both major rib axis and minor rib axis components. The first and second regions undergo geometric deformation when the web material is subjected to an applied elongation along at least one axis.

A method of the present invention comprises the steps of providing a cellulosic substrate; providing a first platen comprising toothed regions and untoothed regions; providing a second platen comprising toothed regions, the second platen being aligned with the first platen such that the toothed regions of the first and second platens mesh when operably engaged; and pressing the cellulosic substrate between the first platen and the second platen such that the toothed regions deform said web to form regions of discrete fan-folded rib-like elements. Optionally, the cellulosic substrate can be moistened prior to the pressing step.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

While the present invention will be described in the context of a tissue paper web, the term "paper web" is not to be so limited. By "paper web" is meant any of various webs formed generally by the method of applying an aqueous slurry of paper fibers onto a suitable forming structure and then subsequently removing the water from the slurry by any of a variety of dewatering means. As such "paper web" includes the base paper for paper products such as paper towels, wipes, facial tissue, and toilet tissue. Methods of forming paper webs also typically include means for significant rearranging of the fibers during the dewatering process, as well as means for foreshortening the finished web, such as by creping or wet microcontraction. "Paper web" may also include paper formed by various air-laying processes, which may or may not include the introduction of water to the air-laid web. Air-laid paper webs may be bonded by methods known in the art, including by use of synthetic fibers, latex, etc.

As used herein, "fibers" refers to fibers suitable for use in forming paper webs of the present invention, including mineral, vegetable, animal, and synthetic fibers. Preferred fibers are vegetable fibers including wood and non-wood fibers. Most preferred in the context of the present invention are wood fibers, such as softwoods and hardwoods typically used for cellulosic paper, such as tissue paper. In general, suitable wood fibers are elongated, tapering, thick-walled plant cells that impart flexibility and tensile strength to paper.

Paper fibers preferred for making tissue paper are generally inelastic. By inelastic is meant that the fibers are not considered to be elastomeric in nature. Further, as a consequence of the nature of fiber-to-fiber bonding in the finished paper web, tissue paper of the type generally useful for bath tissue, towel or wipe applications, is not generally considered to be elastomeric in nature. Although foreshortening provides for some extensibility, when formed on typical papermaking machines uncreped cellulosic paper products tend to be rather inelastic, and substantially in extensible due to the high density of fiber-to-fiber bonding. Rather than extend, the fiber-to-fiber bonds tend to rupture, resulting in tearing.

Therefore, tissue paper webs formed on conventional paper making machines are not only substantially inelastic, but they also do not exhibit appreciable amounts of non-elastic extensibility. In other words, as opposed to web and film materials comprising thermoplastic materials, paper webs generally are not considered elastomeric or extensible in nature. Paper webs do not tend to have the "molecular-level" deformation associated with plastically-deformable materials. However, as disclosed below, the paper of the present invention is unexpectedly highly extensible, and even elastomeric to a certain degree. This surprising extensibility and elasticity are imparted to a base paper web, without regard to the method of manufacture, i.e., conventional or non-conventional drying.

The Paper

A paper web of the present invention is comprised of a plurality of first regions and a plurality of second regions, wherein the first regions are visually distinct from the second regions. As used herein, the term "visually distinct" refers to features of the web material which are readily discernible to the normal naked eye when the web material or objects embodying the web material are subjected to normal use. In addition to first regions being visually distinct from second regions, the first regions bound the second regions such that the second regions form visually distinct patterns on a web of the present invention. Examples of such visually distinct patterns are disclosed herein, and include regular patterns of diamond-shapes; wavy, undulating patterns; regular patterns of triangle-shapes; combinations of shapes; and the like.

Figure 1:
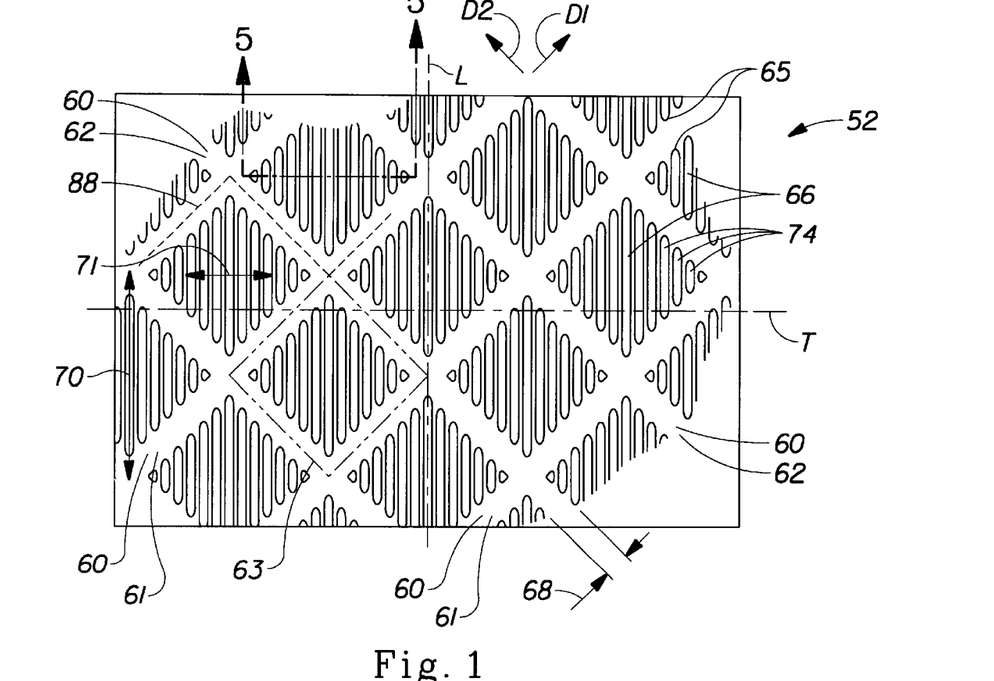
FIG. 1 is a plan view illustration of a preferred embodiment of a paper web of the present invention.
Figure 2:
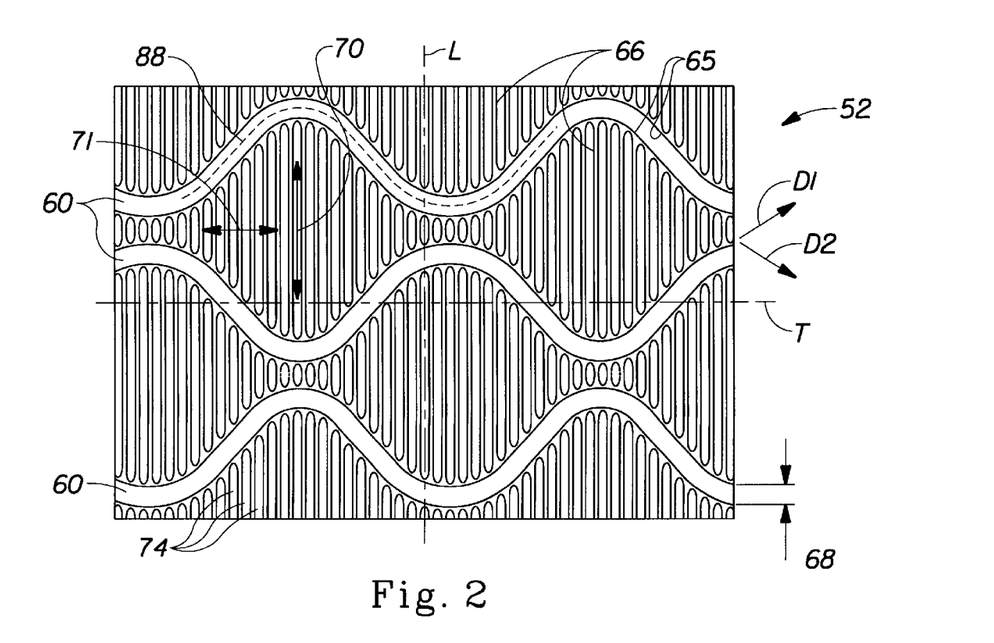
FIG. 2 is a plan view illustration of an alternative embodiment of a paper web of the present invention.

Referring now to FIGS. 1 and 2 there are shown preferred embodiments of a paper web 52 of the present invention having both increased caliper, increased extensibility, and increased elasticity, shown in a substantially untensioned condition. The paper web 52 has two centerlines, a longitudinal centerline, which is also referred to hereinafter as an axis, line, or direction "L" and a transverse or lateral centerline, which is also referred to hereinafter as an axis, line, or direction "T". The transverse centerline "T" is generally perpendicular to the longitudinal centerline "L". In the process of papermaking, wherein a web of material is formed, the longitudinal centerline can be parallel to the "machine direction" (MD), and the transverse centerline can be parallel to the "cross direction" (CD).

Paper web 52 includes a "strainable network" of distinct regions. As used herein, the term "strainable network" refers to an interconnected and interrelated group of regions which are able to be extended to some useful degree in a predetermined direction. Additionally, the strainable network may provide the paper web with useful elastomeric properties. By "elastomeric" is meant that, whereas the base paper may not be elastomeric, when formed into the web of the present invention, the strainable network may impart strain-recovery properties to the web, such that it exhibits elastic-like behavior in response to an applied and subsequently released strain.

The strainable network includes a plurality of first regions 60 and a plurality of second regions 66. Paper web 52 also includes transitional regions 65 which are located at the interface between the first regions 60 and the second regions 66. The transitional regions 65 will exhibit complex combinations of the behavior of both the first region and the second region. It is recognized that every embodiment of the present invention will have transitional regions, however, the present invention is largely defined by the behavior of the web material in distinctive regions (e.g., first regions 60 and second regions 66). Therefore, the ensuing description of the present invention will be concerned with the behavior of the web material in the first regions 60 and the second regions 66 only since it is not significantly dependent upon the complex behavior of the web material in the transitional regions 65.

While first regions 60 are described herein as a "plurality" of first regions 60, it is appreciated that in some embodiments, such as the preferred embodiment of FIG. 1, the plurality of first regions 60 may form a single, interconnected, continuous network "region". As used herein, therefore, the term "plurality of first regions 60" encompasses interconnected first regions which form a single, continuous network region. Although interconnected into a single, continuous network region, first regions 60 can still be considered as discrete, interconnected and intersecting regions, for example regions 61 and 62, as described below.

Paper web 52 has a first surface, (facing the viewer in FIGS. 1 and 2), and an opposing second surface (not shown). In the preferred embodiment shown in FIG. 1, the strainable network includes a plurality of first regions 60 and a plurality of second regions 66. One set of first regions 60, indicated generally as 61, are preferably linear and extend in a first direction, denoted generally as D1. The remaining first regions 60, indicated generally as 62, are preferably linear and extend in a second direction, denoted generally as D2, which is substantially perpendicular to the first direction. While it is preferred that the first direction be perpendicular to the second direction, other angular relationships between the first direction and the second direction may be suitable so long as the first regions 61 and 62 intersect one another. Preferably, the angle between the first and second directions ranges from about 45° to about 135°, with 90° being the most preferred. The intersection of the first regions 61 and 62 can form a boundary, indicated by phantom line 63 in FIG. 1, which completely surrounds the second regions 66.

It is not necessary that intersecting first regions 61 and 62 be generally straight, as shown in FIG. 1. Furthermore, it is not necessary that first regions 60 be intersecting, as shown in FIG. 1. For example, as shown in FIG. 2, first regions 60 may comprise wavy, non-intersecting first regions 60, each of the wavy, non-intersecting first regions 60 forming a reticulated structure having portions extending in first directions D1 and second directions D2. Rather than forming a pattern similar to that of FIG. 1, where first regions 60 completely bound second regions 66, the wavy, non-intersecting first regions 60 shown in FIG. 2 separate, but do not completely bound, second regions 66.

Preferably, the width 68 of the first regions 60 is from about 0.020 inches to about 0.100 inches, and more preferably from about 0.030 inches to about 0.050 inches. However, other width dimensions for the first regions 60 may be suitable. In a preferred embodiment, such as shown in FIG. 1, the first regions 61 and 62 are perpendicular to one another and equally spaced apart, therefore the second regions preferably have a generally square, or diamond, shape. One configuration includes first regions having a width of about 0.040 inches spaced apart in parallel relationship on about a 0.212 inch center to center spacing. However, other shapes for the second region 66 are suitable and may be achieved by changing the spacing between the first regions and/or the alignment of the first regions 61 and 62 with respect to one another.

One notable attribute of first regions 60 is its formation of a "reticulated structure", a portion of which is illustrated in FIGS. 1 and 2, as dashed line 88. By "reticulated structure" with reference to first regions 60 is meant that portions of the first region 60 can be modeled as a two-dimensional spring, providing for extension in the plane of the web, as well as supplying some restorative forces, allowing for some web elasticity.

While the first regions shown in FIGS. 1 and 2 are illustrative of currently preferred patterns for first regions 60, they are not to be limiting. Other intersecting and non-intersecting patterns are contemplated, with the only limitation being that both the first and second regions experience geometric deformation upon application of an applied strain, giving the web increased extensibility and elasticity in at least one direction.

As shown in FIGS. 1 and 2, the paper web 52 has been "formed" by methods disclosed below such that the paper web 52 exhibits extendible or elastomeric properties along an axis, which in the case of the illustrated embodiments is substantially parallel to the transverse axis of the paper web, when subjected to an applied axial elongation in a direction substantially parallel to the transverse axis. As used herein, the term "formed" refers to the creation of a desired structure or geometry upon a paper web that will substantially retain the desired structure or geometry when it is not subjected to any externally applied elongation or forces.

First regions 60 are substantially macroscopically monoplanar, that is, substantially unmodified by subsequent processing such that they experience little or no out of plane deformation. That is, the material within the first regions 60 is in substantially the same condition before and after the formation step undergone by web 52. The second regions 66 include a plurality of raised rib-like elements 74. The rib-like elements 74 may be embossed, debossed or a combination thereof to form what can generally be described as "fan-folded" structures. Each fan-folded structure of rib-like elements 74 has a first or major rib axis 70 which is substantially parallel to the longitudinal axis of the web 52 and a second or minor rib axis 71 which is substantially parallel to the transverse axis of the web 52. For each rib-like element 74, major rib axis 70 is substantially perpendicular to minor rib axis 71. The rib-like elements 74 can be contiguous, having no unformed areas between them.

Figure 3:
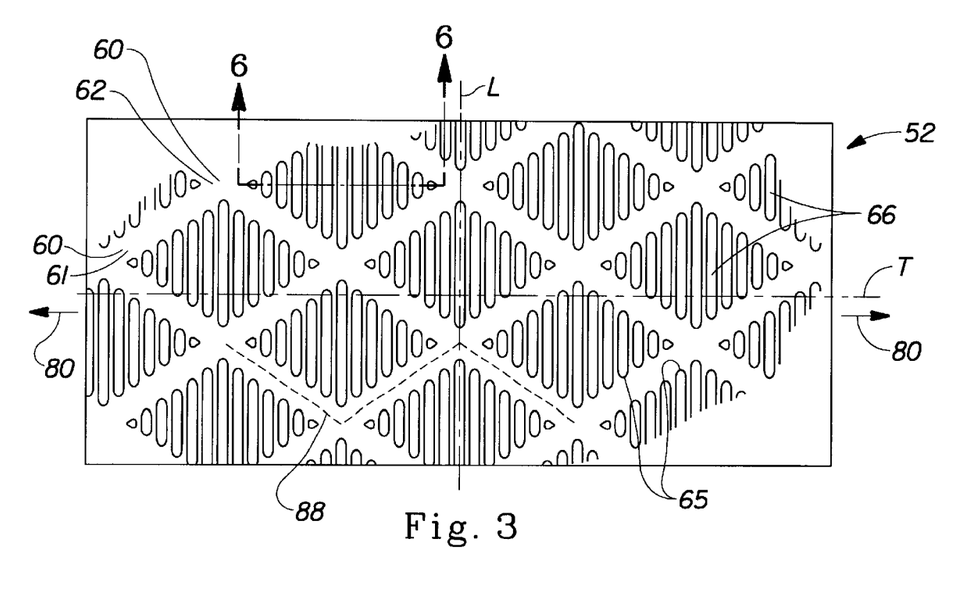
FIG. 3 is a plan view illustration of a paper web of FIG. 1 in a tensioned condition.

The major rib axis 70 and minor rib axis 71 of the raised rib-like elements may be oriented relative to the plane of the web in ways other than shown in FIGS. 1 or 3, such as by orienting the major rib axis 70 substantially parallel with the transverse axis of the web. Also, it is currently preferred that the major axes 70 of each rib-like element 74 be aligned parallel to one another, but many benefits of the present invention, including increased bulk, can be realized even if they are not.

As web 52 is subjected to an applied axial strain, D, indicated by arrows 80, shown in FIG. 3, the rib-like elements 74 in the second regions 66 experience geometric deformation, or unfolding, and offer minimal resistance to the applied elongation. In addition, the shape of the first regions 60 changes as a result of the applied axial strain, due to the ability of the reticulated structure formed by the first regions 60, to act as a two-dimensional spring, i.e., to elongate by experiencing a change in the angular relationship between first direction D1 and second direction D2. As first regions 60 experience geometric deformation, second regions 66 experience a change in shape as well, since first regions 60 border, separate, and in some instances, bound second regions 66.

Accordingly, as the web 52 is subjected to the applied elongation, the first regions 60 experience geometric deformation, i.e., straightening out of the reticulated structure, thereby changing the shape of the second regions 66. The second regions are extended or lengthened in a direction parallel to the direction of applied elongation, and shortened in a direction perpendicular to the direction of applied elongation. Other modes of geometric deformation are observed, as disclosed more fully below.

As can be seen in FIGS. 1 and 3, first regions 60, whether intersecting or not, generally have portions which extend in either first direction D1 or second direction D2 which have a major rib axis component, and a minor rib axis component in the plane of the web. In other words, it is preferable that the first or second directions, D1 or D2, should not be configured such that either is parallel with either major or minor rib axes 70, 71, of second regions 66, as described more fully below. Portions of first regions 60 which do not have both major or minor rib axis components, such as the point of intersection of first regions 60 in FIG. 1, are preferably minimized, and are believed to have little impact on the extensible or elastomeric properties of the web.

Figure 4:
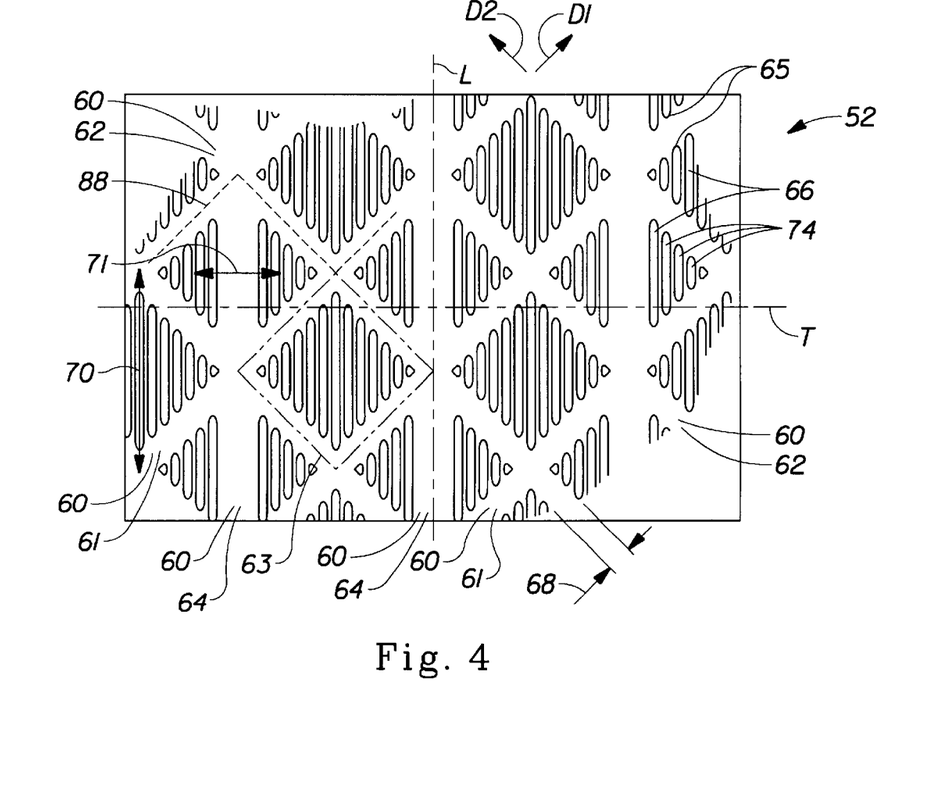
FIG. 4 is a plan view illustration of an alternative embodiment of a paper web of the present invention.
Figure 10:
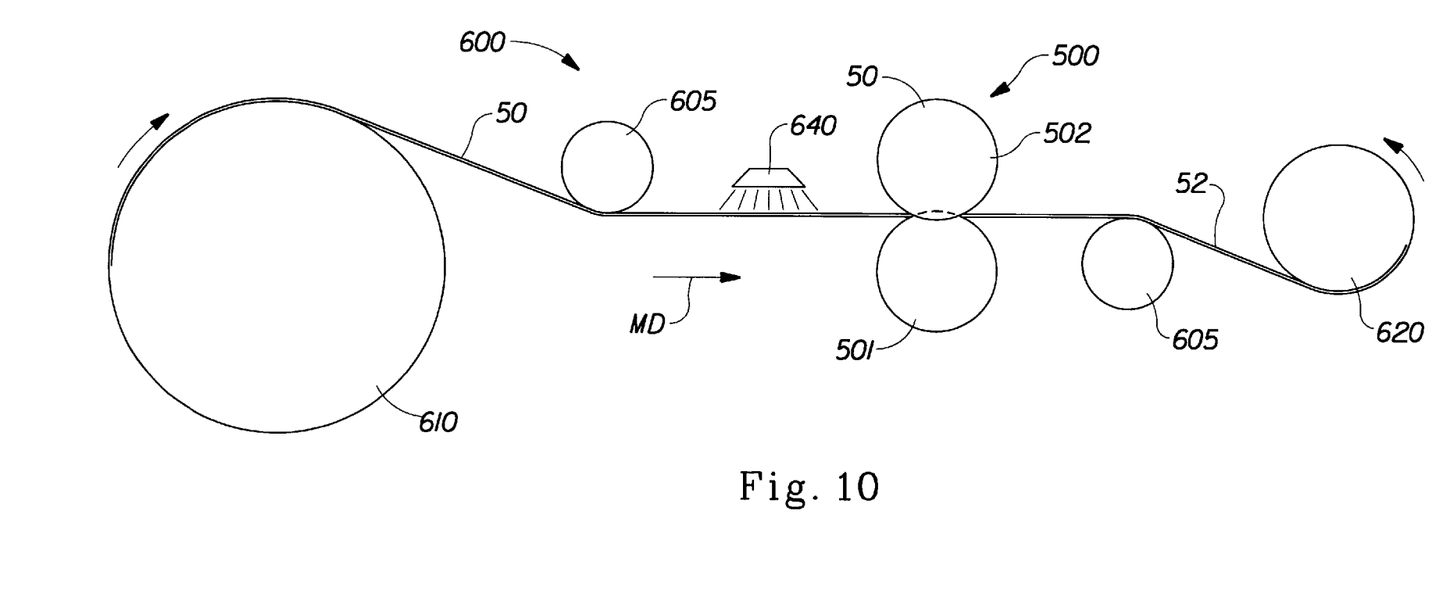
FIG. 10 is a schematic representation of a preferred method of forming a paper web of the present invention.

While it is generally desirable to minimize the portions of first regions 60 that do not have both major and minor rib axis components, many benefits of the present invention may be realized with substantial areas of first regions 60 aligned with either the major or minor axes of second regions 66. For example, the web shown in FIG. 4, having some first regions 64 parallel to major rib axis 70 remains bulky and extensible. Such a configuration may be useful in retaining machine direction tensile strength when major rib axes 70 are in parallel alignment with longitudinal axis L, which in turn corresponds to the machine direction during web processing, as indicated in FIG. 10. Other configurations are contemplated, such as having some first regions 64 parallel to major rib axes 70, as shown in FIG. 4, but having the major rib axes 70 in parallel alignment with transverse axis T, which, in turn, can correspond to the cross machine direction during web processing.

Without being bound by theory, it is believed that the extensible, or elastic, nature of a paper web of the present invention is due to the ability of the fan-folded structure of second regions 66 to "unfold" in a three-dimensional geometric manner along the rib-like elements. At the same time, the first regions 60 contract in a direction generally perpendicular to the applied loading, in a two-dimensional, geometric manner generally in the plane of the paper web, as shown in FIG. 3. The contraction of first regions 60 and resulting shape change of second regions 66 can be considered analogous to a two dimensional Poisson effect. For example, as best described with reference to FIG. 1, as the web is extended in a direction generally parallel to the transverse centerline T, the shape of second regions 60 change as depicted in FIG. 2, with one dimension increasing, and another dimension decreasing. As discussed above, the simultaneous unfolding of second regions 66, and contraction of first regions 60, is provided for by avoiding substantial parallel alignment of the major or minor axes 70 or 71, with either the first or second directions, D1 or D2 of first regions 60.

Figure 5:
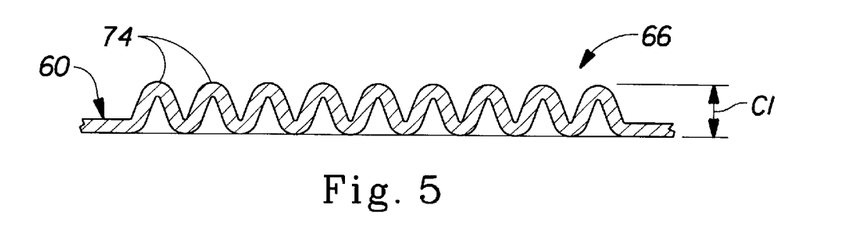
FIG. 5 is a cross-sectional view of Section 5—5 shown in FIG. 1.
Figure 6:
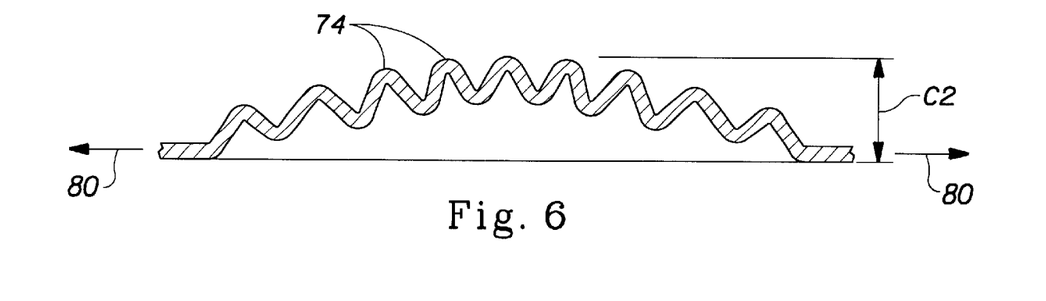
FIG. 6 is a cross-sectional view of Section 6—6 shown in FIG. 3.

One additional very beneficial attribute of a paper web of the present invention is its ability to increase in bulk in response to extension in at least one direction. Without wishing to be bound by theory, this behavior is now described in terms of discrete modes of geometric deformation, with reference to FIGS. 5 and 6. FIG. 5 shows cross-section 5—5 of an unstretched portion of web 52, as shown in FIG. 1. Second region 66 is shown with representative rib-like elements 74 as initially formed by the method of the present invention. At initial formation, rib-like elements give the paper web an initial caliper C1. When subjected to an applied axial elongation, D, indicated by arrows 80 in FIGS. 2 and 6, the rib-like elements 74 in the second regions 66 experience a first mode of geometric deformation, that is, unfolding of the rib-like elements in accordion-like fashion. As the first mode geometric deformation occurs, the shape of the second regions 66 simultaneously changes as a result of a second mode of geometric deformation, that is, movement of the reticulated structure formed by the first regions 60, such as intersecting first regions 61 and 62, as shown in FIG. 2. The second mode of geometric deformation causes the second regions 66 to contract or shrink in a direction perpendicular to the direction of applied elongation. As the shape of the second regions 66 changes, the rib-like elements 74 of the second region 66 undergo a third mode of geometric deformation as they are forced out of the plane of their original position by buckling forces generally perpendicular to the applied elongation. As shown in FIG. 6, this buckling, or "puffing up" of the web upon extension, causes a caliper increase. If extended beyond the web's elastic range, much of this caliper increase remains after the extension force is removed, giving the web a new caliper C2. This "puffing up" of the web gives even more texture and bulk to the web, further increasing the desirable caliper-generating attributes of a web of the present invention.

Therefore, one very beneficial result of the paper of the present invention is its increased bulk and texture, due to the raised rib-like elements formed in second regions 66, together with extensibility, due to the geometric relationship between the first and second regions. Depending on the base paper, and the processing parameters used (as discussed below), the paper also exhibits a significant amount of elasticity in at least direction. The increased extensibility and elasticity are in addition to good overall look and feel, which is important for consumer acceptance.

Method of Making

Figure 7:
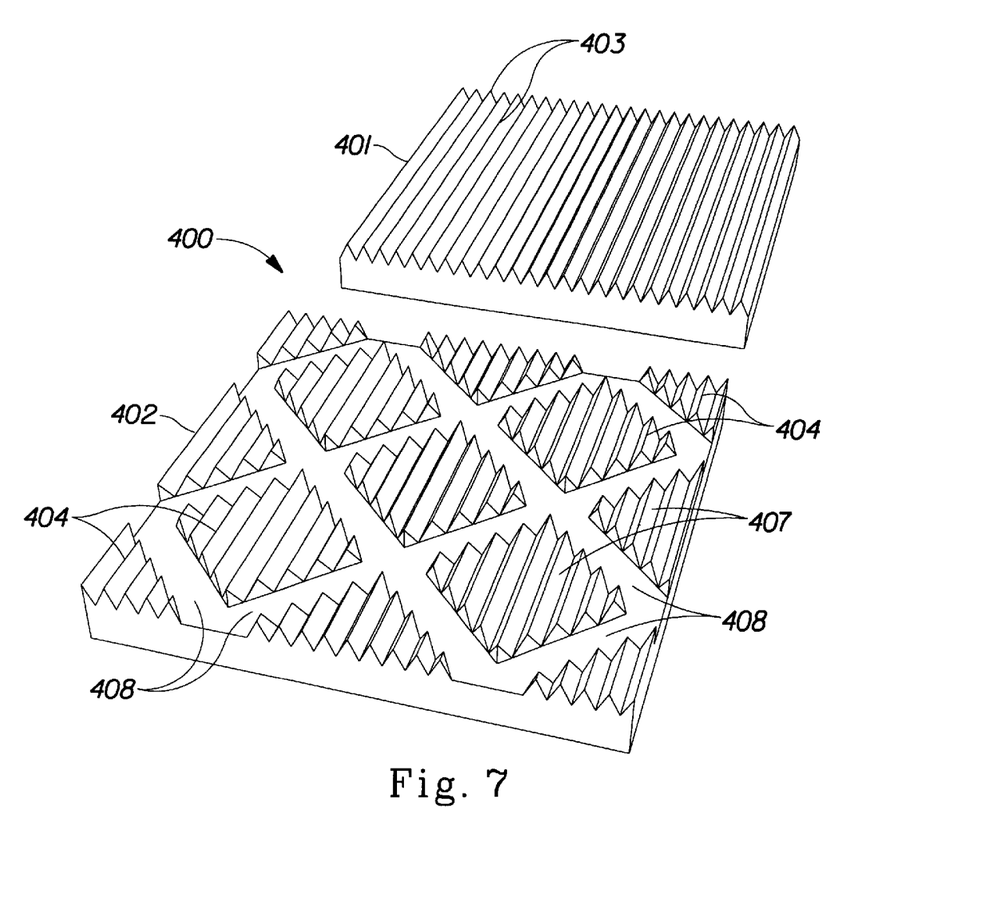
FIG. 7 is a simplified perspective view of an apparatus used to form a paper web of the present invention with a portion of the apparatus being tilted to expose the teeth.

Referring now to FIG. 7, there is shown an apparatus 400 used to form paper web 52 shown in FIG. 1. Apparatus 400, includes intermeshing plates 401, 402. Plates 401, 402 include a plurality of intermeshing teeth 403, 404, respectively. Plates 401, 402 are brought together under pressure to form the web of the present invention.

Plate 402 includes toothed regions 407 and grooved regions 408. Within toothed regions 407 of plate 402 there are a plurality of teeth 404. Plate 401 includes teeth 403 which mesh with teeth 404 of plate 402. When a paper web is formed between plates 401, 402 the portions of the web which are positioned within grooved regions 408 of plate 402 and teeth 403 on plate 401 remain substantially undeformed. These regions correspond with the first regions 60 of web 52 shown in FIG. 1. The portions of the web positioned between toothed regions 407 of plate 402, (which comprise teeth 404), and teeth 403 of plate 401 are incrementally formed creating rib-like elements 74 in the second regions 66 of paper web 52.

While FIG. 7 shows plates suitable for use in producing paper having a pattern of first regions 60 as shown in FIG. 1, one skilled in the art can easily envision similar plates for producing other patterns, such as the patterns shown in FIGS. 2 and 4. It is believed that the paper of the present invention is pattern-independent, i.e., as long as first regions 60 form a pattern of "reticulated structures", and second regions 66 have raised rib-like members, such that first and second regions may undergo geometric deformation as described above, the pattern is within the scope of the present invention. Such patterns allow the disclosed modes of geometric deformation to occur, which in turn allow the paper to exhibit extensibility, elasticity and increased caliper upon tensioning.

Likewise, while FIG. 7 shows one plate with toothed regions (plate 401) and one plate with grooved, i.e., untoothed, regions (plate 402), one skilled in the art can easily envision both plates having toothed regions 407 and grooved regions 408. In this configuration, it may be advantageous to use identical patterned plates which intermesh with the patterns in registry, or in an offset position, with the patterns in a regular or random offset pattern. It may be advantageous to use plates, both having toothed and untoothed regions, in which one plate has untoothed regions forming a first pattern, and the other plate has untoothed regions forming a second, different, pattern. These and other variations in plate design and configuration are meant to be exemplary, but not limiting, of preferred and contemplated embodiments of the present invention.

Figure 8:
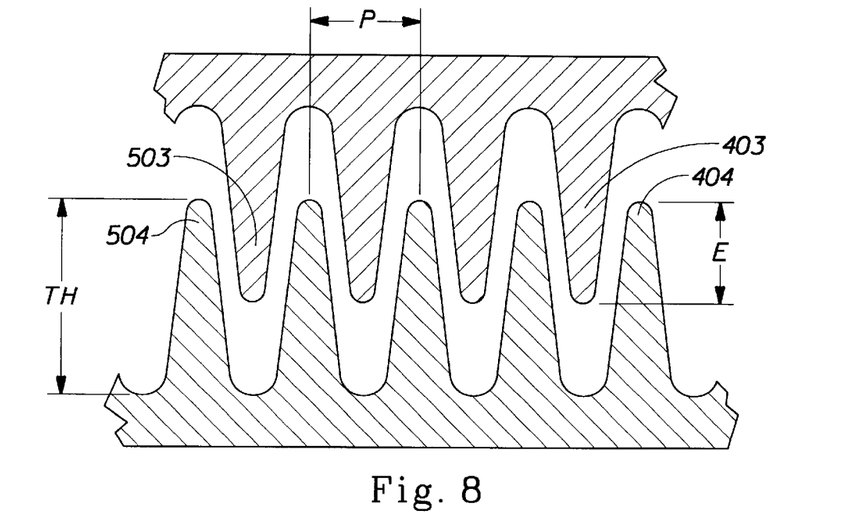
FIG. 8 is a simplified cross-sectional view of meshing teeth of an apparatus used to form a paper web of the present invention.

FIG. 8 shows a partial cross-section of meshing teeth 403 and 404. The depth, spacing, and frequency of rib-like elements can be varied to control the resulting increase in caliper, as well as the available stretch of a web of the present invention. In particular, the frequency, spacing, and depth of rib-like elements 74 determines the surface-pathlength of the second region. As used herein, "surface-pathlength" refers to a measurement along the topographic surface of the region in question in a direction substantially parallel to an axis, as disclosed in commonly assigned U.S. Pat. No. 5,518,801 issued May 21, 1996 to Chappell et al, which is hereby incorporated herein by reference. A preferred tooth configuration for a web of the present invention is a tooth height of 0.060 inches and a pitch of 0.030 inches.

The height of formation of a finished web of the present invention may be set by the depth of engagement of the intermeshing plates. As shown in FIG. 8, depth of engagement E, is measured from tip of teeth 403 to tip of teeth 404. As depth of engagement E increases, the height of rib-like elements 74 is increased. Without being bound by theory, it is believed that permanent deformation of the paper web is accomplished by breaking fiber bonds and reorienting fibers, since paper is not plastically deformable. The greater the level of engagement E, the greater the breakage of fiber bonds and the greater reorientation. Therefore, the tensile properties of the paper web tends to decrease with increasing engagement. For a given starting caliper, the tooth height TH, pitch P, and engagement E may be adjusted for a good balance of tensile properties, caliper, and web elasticity and extensibility.

Figure 9:
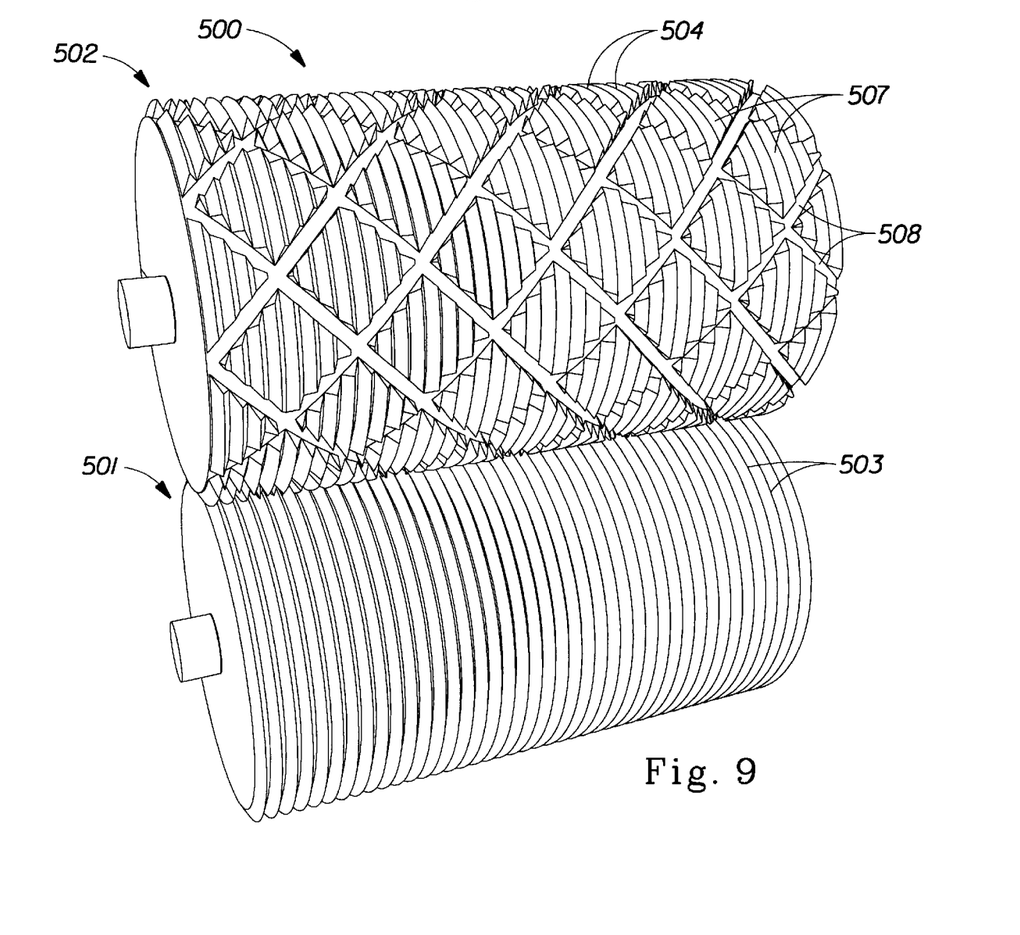
FIG. 9 is a simplified perspective view of a preferred apparatus useful for forming a paper web of the present invention.

The method of formation can be accomplished in a static mode, where one discrete portion of a paper web is deformed at a time. Alternatively, the method of formation can be accomplished using a continuous, dynamic press for intermittently contacting a moving paper web and forming the web into a formed paper web of the present invention. Such a dynamic press includes intermeshing toothed press rolls 500, as shown in FIG. 9. Roll 502 includes toothed regions 507 and grooved regions 508. Within toothed regions 507 of roll 502 there are a plurality of teeth 504. Roll 501 includes teeth 503 which mesh with teeth 504 of roll 502. When a paper web is formed between rolls 501, 502 the portions of the web which are positioned within grooved regions 508 of roll 502 and teeth 503 on roll 501 remain substantially undeformed. These regions correspond with the first regions 60 of web 52 shown in FIG. 1.

Dynamic press rolls 500 are preferably used in forming apparatus 600, shown schematically in FIG. 10, as one of the elements in a method of making paper webs of the present invention. Forming apparatus 600 comprises means for unwinding a continuous web 50 of paper from roll stock 610. Paper web 50 is guided by suitable means 605 to press rolls 500 where forming into a web 52 of the present invention is accomplished. Once web 52 is formed, it may be guided by suitable means 605 to further converting processes, such as take-up roll 620. Further method variations are contemplated, including methods and variations fully described in U.S. Pat. No. 5,518,801 issued to Chappell, et al. on May 21, 1996 which is hereby incorporated herein by reference.

While FIG. 9 shows one roll with toothed regions (roll 501) and one plate with grooved, i.e., untoothed, regions (roll 502), one skilled in the art can easily envision both rolls having toothed regions 507 and grooved regions 508. In this configuration, it may be advantageous to use identical patterned rolls which intermesh with the patterns in registry, or in an offset position, with the patterns in a regular or random offset pattern. It may be advantageous to use rolls, both having toothed and untoothed regions, in which one roll has untoothed regions forming a first pattern, and the other roll has untoothed regions forming a second, different, pattern. Similarly, it may be advantageous to use rolls having differing diameters, with the same or different patterns formed by the grooved regions 508. These and other variations in roll design and configuration are meant to be exemplary, but not limiting, of preferred and contemplated embodiments of the present invention.

In an alternative embodiment, the method of the present invention includes the application of a wetting agent to web 50 prior to forming in press rolls 500. A preferred wetting agent is water, but other wetting agents, including, for example, wet strength chemicals, softening chemicals, may be added. While the addition of wetting agents does not significantly affect caliper increase or extensibility properties, it does appear to minimize the loss of tensile strength experienced after processing. Without being bound by theory, it appears that the addition of a wetting agent, e.g., water, preserves a certain amount of tensile strength due to plasticization of the cellulosic fiber structure. The addition of water plasticizes the cellulosic structure to allow it to be more readily formed by the method of the present invention without as much fiber breakage as would be experienced under dry conditions. This plasticization is probably due to the reduction of hydrogen boding within the cellulosic structure, and relies on fiber swell to plasticize and allow the fibers to be more flexible. Wet strength additives (added during web formation), such as Kymene 557H, or carboxy methyl cellulose (CMC), available under the trade name 7MT, both available from Hercules, Inc. of Wilmington DE., can help the structure to remain bonded during the plasticization of the fibers.

As shown in FIG. 10, water applicator 640 can apply a predetermined amount of water to web 50 to add from about 10% to 80%, preferably 40% to 60%, moisture content by weight to the web. In one embodiment, a level of 50% by weight was applied to a web with good success in minimizing loss of tensile strength. Once formed, web 52 may be dried by suitable means, or it may be processed wet in further converting operations, with drying occurring by evaporation once web is formed into take-up roll 620.

Paper webs of the present invention may include laminates, i.e., multiple ply paper webs. Laminates may be combined before, during, or after the forming step by any number of bonding methods known to those skilled in the art. Such bonding methods include, but are not limited to, thermal bonding, pressure bonding, and adhesive bonding (using any of a number of adhesives including but not limited to spray adhesives, hot melt adhesives, latex based adhesives and the like). Adhesive bonding may be accomplished by uniformly applying a layer of adhesive onto one ply prior to laminating, or by applying adhesive to at least one ply as discrete bond sites, e.g., spot bonding in a regular or random pattern. Alternatively, adhesive may be applied to at least one ply in a continuous network, e.g., a network corresponding to the continuous first regions of FIG. 1.

In one embodiment, a laminate was made by adhesively bonding two plies of conventional paper using a pressure sensitive spray adhesive, "Super 77®" marketed by 3M Corp. A very light mist of the adhesive was applied uniformly to one ply; a second ply was carefully placed on top of the ply containing the adhesive, taking care not to wrinkle either ply. Light hand pressure was then used to ensure that the two plies were bonded together.

When made into a multiple ply laminate, webs of the present invention may be positioned in any of various configurations. For example, if both webs of a 2-ply laminate are formed with second regions 66 of rib-like elements 74, the second regions 66 of each may be positioned such that they are in registry in the laminate structure. Alternatively, it may be beneficial to place the second regions of each ply such that they are out of registry when laminated. Similarly, it may be beneficial to form a multiple ply laminate using a first pattern on one web, and a second, different pattern on the another web.

In the event that extensibility of the paper web is not desired, a multiple ply laminate may be made that has essentially double the bulk of each base web without the extensibility of either base web. This may be accomplished by laminating at least two webs of the present invention, each having major rib axes 70 of second regions 66 being generally perpendicular to the major rib axes 70 of the second regions 66 of the other ply. For example, with reference to FIG. 1, one web having second regions 66 with a major rib axis 70 generally parallel to longitudinal centerline "L" may be laminated with a second web having second regions 66 with a major rib axis 70 generally perpendicular to longitudinal centerline "L". Since paper web 52 can be made to exhibit relatively little extensibility in the direction generally parallel to first axes 70, a laminate made in the fashion may exhibit relatively little extension in either direction.

EXAMPLES

The following are examples of specific embodiments of the present invention. Data for caliper, elongation, and tensile strength were obtained by the test methods disclosed in the Test Methods section below.

Example 1

A paper web of the invention was made using intermeshing plates, similar to those depicted in FIG. 7. The intermeshing plates were made by casting an aluminum filled epoxy material on a machined metal mold to produce two intermeshing plates approximately 5 inches wide, 12 inches long, and 0.75 inches thick. The teeth of the intermeshing plates were essentially triangle-shaped, i.e., tapered, measuring about 0.030 inches at the base and tapering to a vertex having a radius of approximately 0.008 inches. The height of each tooth was 0.060 inches and they were set on a pitch of 0.030 inches. Each plate is fitted with matching holes and pins to ensure accurate and consistent mating of the plates when brought together. A series of grooves corresponding to grooved regions 408 of FIG. 7 were machined on the toothed side of one plate corresponding to plate 402 of FIG. 7. The grooves measured 0.040 inches in width with parallel grooves being on 0.275 inch center to center spacing.

A single ply paper web of Northern Softwood Kraft fibers having a basis weight of 20 lbs. per 3000 sq. ft. was made on conventional papermaking equipment. The paper was evenly saturated with distilled water to approximately 80% by weight of the dry paper web. The saturated paper was placed between the two intermeshing plates, with the machine direction of the paper web being oriented in the longitudinal direction, corresponding to longitudinal centerline L as shown in FIG. 7. As can be noted, this configuration provides that the longitudinal machine direction is also parallel to the minor rib axis of rib-like elements of the formed web.

The intermeshing plates with the paper in place between them were placed in a hydraulic press with a platen larger than the plates to ensure even pressure over the plates. Spacers were placed at the edges of the plates to limit the amount of engagement of the intermeshing plates to 0.018 inches. The plates were compressed by the hydraulic press with a force of 4000 lbs, causing the deformation of the paper by the intermeshing toothed elements of the plates. The pressure was removed after approximately 10 seconds and the paper allowed to air dry.

The base paper web and the formed paper web were tested by the test methods described below and compared. The base paper had a caliper of 8.1 mils (0.008 inches) and a cross direction stretch of 6.1%. After forming by compressing between the intermeshing plates, the web had a caliper of 24.1 mils and a cross-direction stretch of 24.4%. Because the basis weight of the paper remained substantially unchanged, the increase in caliper represents a bulk increase of approximately 200%. Therefore, both bulk and cross direction stretch were increased substantially.

Example 2

A paper web of the invention was made by the process depicted in FIG. 10. The rollers of press rolls 500 were made by machining grooves into two 10-inch long, six-inch diameter steel rolls, corresponding to rollers 501 and 502 shown in FIG. 9. The machined grooves defined teeth corresponding to teeth 503 and 504 as shown in FIG. 9. The teeth were substantially triangle-shaped measuring about 0.030 inches at the base and tapering to a vertex having a radius of approximately 0.004 to 0.008 inches. The height of each tooth was 0.060 inches and they were set on a pitch of 0.030 inches. A series of grooves corresponding to grooved regions 508 of FIG. 9 were machined on of the rollers corresponding to roller 502 of FIG. 9. The grooves measured 0.040 inches in width with parallel grooves being on 0.275 inch center to center spacing. The two rollers were set in intermeshing relationship to form toothed press rolls, corresponding to press rolls 500 as shown in FIG. 10.

A single ply paper web of Northern Softwood Kraft fibers having a basis weight of 20 lbs. per 3000 sq. ft. was made on conventional papermaking equipment and provided on a roll, corresponding to roll 610 of FIG. 10. The paper was fed into the press rolls at a rate of 45 ft per min with the press rolls set at various levels of engagement. The toothed and untoothed regions of the press rolls were configured such that the machine direction of the paper web was parallel to the major rib axis of the rib-like elements of the formed paper. Water, if used, was applied with a Spray Systems Co. of Wheaton, Ill. nozzle, in particular nozzle number 2850/73320, prior to forming in the press rolls.

Table 1 below shows how the caliper and cross direction stretch of the base paper web changed as a result of various levels of engagement and application of water to the web. Additionally, the change in machine direction tensile strength is shown to illustrate further beneficial results of adding water to the web prior to forming. As can be seen from Table 1, caliper and machine direction stretch are successfully increased with increasing engagement. Of special note is the comparison of the results of an engagement of 0.020 inches with, and without, application of water. Even though machine direction tensile properties decline with increasing engagement, the application of water substantially improves the machine direction tensile properties for a particular engagement.

TABLE 1

Comparison of Paper Properties

| Engagement (in) | Water Added (%) | Peak MD Tensile (g/in) | Caliper (mils) | CD Stretch (%) |
|---|---|---|---|---|
| Base Paper | 0 | 2350 | 9.6 | 6.3 |
| 0.010 | 50 | 1950 | 14 | 15.4 |
| 0.015 | 50 | 1368 | 19 | 24.1 |
| 0.020 | 50 | 948 | 23 | 28.7 |
| 0.020 | 0 | 380 | 22 | 28.3 |
| 0.025 | 50 | 853 | 26 | 39.1 |

Test Methods

Caliper

Caliper of the paper web is measured as the thickness of the preconditioned paper when subjected to a compressive load of 95 g/in$^2$ (15 g/cm$^2$) with a 2 inch diameter presser foot. "Preconditioned" means a web at 23±1° C., 50±2% relative humidity for 24 hours according to a TAPPI method #T4020M-88. The caliper is measured with a Thwing-Albert model 89-11 thickness tester (Thwing-Albert Co. of Philadelphia, Pa.).

Tensile and Percent Stretch Test

The tensile test is used for measuring force versus percent elongation properties. The tests are performed on a Thwing-Albert Intellect II-STD Model No. 1451-24PGB, available from the Thwing-Albert Co. of Philadelphia, Pa.

The samples used for this test are 1" wide ×6" long with the long axis of the sample cut parallel to the direction of maximum extensibility of the sample. The sample should be cut with a sharp Exacto knife or some suitably sharp cutting device design to cut a precise 1" wide sample. (If there is more than one direction of extensibility of the material, samples should be taken parallel to representative direction of elongation). The sample should be cut so that an area representative of the symmetry of the overall pattern of the deformed region is represented. There will be cases (due to variations in either the size of the deformed portion or the relative geometries of regions 1 and 2) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested.

The grips of the Thwing-Albert tensile tester consist of air actuated grips designed to concentrate the entire gripping force along a single line perpendicular to the direction of testing stress. The distance between the lines of gripping force should be 4" as measured by a steel rule held beside the grips. This distance will be referred to from hereon as the "gauge length". The sample is mounted in the grips with its long axis perpendicular to the direction of applied percent elongation. The crosshead speed is set to 4 in/min. The crosshead elongates the sample until the sample breaks at which point the crosshead stops and returns to its original position (0% elongation). The percent stretch is percent elongation at which the maximum load is achieved prior to failure of the paper sample. The average percent stretch for three samples is recorded in Table 1.

While particular embodiments of the present invention have been illustrated and described, it would be obvious to those skilled in the art that various other changes and modification can be made without departing from the spirit and scope of the present invention. Additionally, while an entire web of the present invention may include a strainable network of first and second regions, the present invention may also be practiced by providing only specific portions of the paper web with a strainable network comprised of first and second regions. The foregoing is therefore intended to cover in the appended claims all such changes and modifications that are within the scope of the present invention.

What is claimed is:

1. A cellulosic paper web having a longitudinal centerline and a transverse centerline, said paper web comprising a plurality of first regions and a plurality of second regions, said first regions forming boundaries separating said second regions, said first regions being substantially in a plane of said paper web and said second regions comprising a plurality of raised out of-said-plane rib-like elements In a fan-folded configuration, said rib-like elements of each said second region being disposed parallel to a major rib axis and perpendicular to a minor rib axis, with all or most of each said first regions having both major rib axis and minor rib axis components; said first and second regions undergoing geometric deformation when said web material is subjected to an applied elongation along at least one said axis and, wherein said rib-like elements are capable of undergoing a third mode of geometric deformation, said third mode of geometric deformation being an out of-said-plane extension of said second region when said wed materials is subjected to an applied elongation along at least one said axis and whereby said fan-folded out-of-said-plane rib-like elements unfold in a three dimensional geometric manner along the rib-like elements.

2. The paper web of claim 1, wherein said first regions form a continuous network, such that said first region forms boundaries completely surrounding said second regions.

3. The paper web of claim 1, wherein each said major rib axis is substantially parallel to said longitudinal centerline.

4. The paper web of claim 1, wherein each said major rib axis is substantially parallel to said transverse centerline.

5. The paper web of claim 1, wherein said first regions form reticulated structures, capable of undergoing a first mode of geometric deformation in said plane of said web, said first mode of deformation being a general extension of said reticulated structures in said plane of said web when said web material is subjected to an applied elongation along at least one said axis.

6. The paper web of claim 1, wherein said rib-like elements form fan-folded structures, capable of undergoing a second mode of geometric deformation, said second mode of geometric deformation being a general unfolding of said fanfolded structures when said web material is subjected to an applied elongation along at least one said axis.

7. The paper web of claim 1, wherein said web is extensible in a direction parallel to said minor rib axis at least about 15%.

8. The paper web of claim 1, wherein said web is extensible in a direction parallel to said minor rib axis at least about 28%.

9. A multiple ply cellulosic paper web, comprising a plurality of first regions and a plurality of second regions, said first regions forming boundaries separating said second regions, said first regions being substantially in a plane of said paper web and said second regions comprising a plurality of raised out-of-said-plane rib-like elements in a fan-folded configuration, said rib-like elements of each said second region being disposed parallel to a major rib axis and perpendicular to a minor rib axis, with all or most of each said first regions having both major rib axis and minor rib axis components; said first and second regions undergoing geometric deformation when said web material is subjected to an applied elongation along at least one said axis and, wherein said rib-like elements are capable of undergoing a third mode of geometric deformation, said third mode of geometric deformation being an out-of-said plane extension of said second region when said web material is subjected to an applied elongation along at least one said axis and whereby said fan-folded out-of-said-plane rib-like elements unfold in a three dimensional geometric manner along the rib-like elements.

10. The multiple ply paper web of claim 9, wherein said first regions of at least one ply form a continuous network, such that said first region forms boundaries completely surrounding said second regions.

11. The multiple ply paper web of claim 9, wherein each said major rib axis of at least one ply is substantially parallel to said longitudinal centerline.

12. The multiple ply paper web of claim 9, wherein each said major rib axis of at least one ply is substantially parallel to said transverse centerline.

13. The multiple ply paper web of claim 9, wherein each said major rib axis of one ply is substantially perpendicular to each said major rib axis of at least one other ply.

14. The multiple ply paper web of claim 9, wherein said second regions of at least one ply are in registry with said second regions of at least one other ply.

15. The multiple ply paper web of claim 9, wherein said second regions of at least one ply are out of registry with said second regions of at least one other ply.

16. The multiple ply paper web of claim 9, wherein said plurality of second regions form a visually distinct pattern on each said ply.

17. The multiple ply paper web of claim 16, wherein at least one said ply comprises a first visually distinct pattern, and at least one said ply comprises a second visually distinct pattern, said second visually distinct pattern different from said first visually distinct pattern.

18. The multiple ply paper web of claim 9, wherein at least one said ply is bonded to at least one other said ply.

19. The multiple ply paper web of claim 18, wherein said plies are bonded by adhesive.

20. The multiple ply paper web of claim 19, wherein said adhesive is applied on at least one said ply as discrete bond sites.

21. The multiple ply paper web of claim 19, wherein said adhesive is applied on at least one said ply as a continuous network.

* * * * *